5 Sheets—Sheet 1.

H. R. SMITH & N. K. WADE.
PIPE MOLDING.

No. 179,669. Patented July 11, 1876.

WITNESSES
Jno. P. Jacobs
Wm. A. Skinkle

INVENTORS
Herbert R. Smith
&
Nicholas K. Wade.

By their Attorney
Wm. D. Baldwin

H. R. SMITH & N. K. WADE.
PIPE MOLDING.
No. 179,669. Patented July 11, 1876.
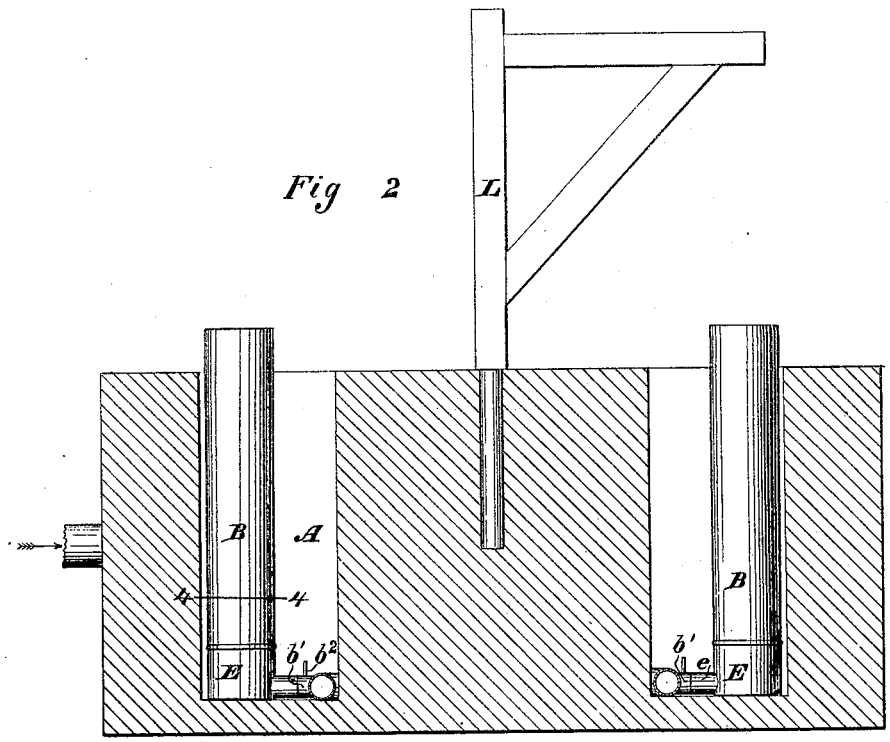
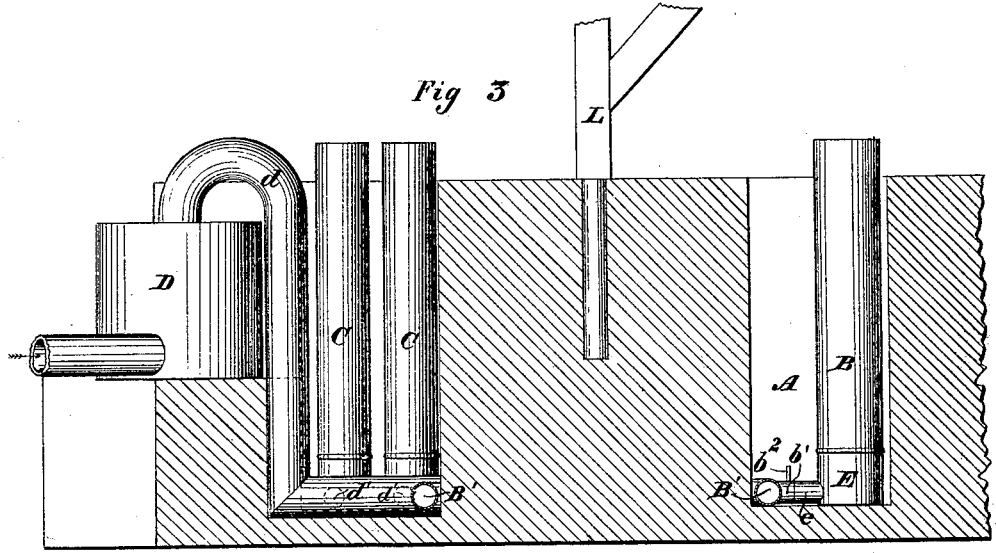
WITNESSES
Jno. P. Jacobs
Wm. A. Skinkle
By their Attorney
Wm. D. Baldwin
INVENTORS
Herbert R. Smith
&
Nicholas K. Wade H. R. SMITH & N. K. WADE.
PIPE MOLDING.
No. 179,669.  Patented July 11, 1876.
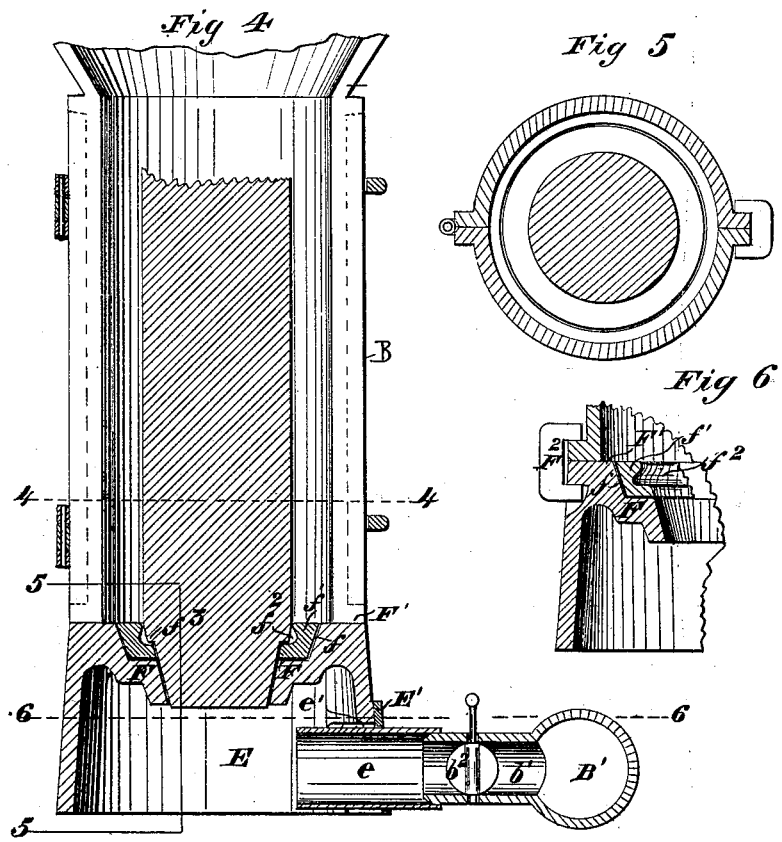
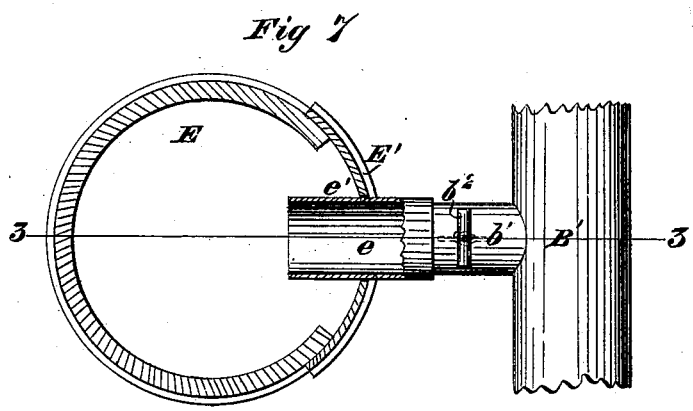
WITNESSES
Jno. P. Jacobs
Wm. A. Skinkle
INVENTORS
Herbert R Smith
Nicholas K Wade
By their Attorney
Wm D. Baldwin 5 Sheets—Sheet 4.

H. R. SMITH & N. K. WADE.
PIPE MOLDING.

No. 179,669. Patented July 11, 1876.

WITNESSES
Jno. P. Jacobs
Wm. A. Skinkle

By their Attorney
Wm. D. Baldwin

INVENTORS
Herbert R. Smith
&
Nicholas K. Wade

5 Sheets—Sheet 5.

H. R. SMITH & N. K. WADE.
PIPE MOLDING.

No. 179,669. Patented July 11, 1876.

WITNESSES
Wm. A. Skinkle
F. Stith

INVENTORS
Herbert R. Smith
Nicholas K. Wade.
By their Attorney
W. D. Baldwin

UNITED STATES PATENT OFFICE.

HERBERT R. SMITH AND NICHOLAS K. WADE, OF COLUMBUS, OHIO.

IMPROVEMENT IN PIPE-MOLDING.

Specification forming part of Letters Patent No. 179,669, dated July 11, 1876; application filed April 5, 1876.

*To all whom it may concern:*

Be it known that we, HERBERT R. SMITH and NICHOLAS K. WADE, both of Columbus, in the county of Franklin and State of Ohio, have invented certain new and useful Improvements in the Art of Molding and Casting Pipe and in Apparatus therefor, of which the following is a specification:

Our invention relates to improvements, by which a saving of both time and labor is effected in the method of molding and casting pipe known as the vertical method, in which the flasks are arranged upright in a row in a suitable pit, chamber, or place.

Our objects are to form the mold, blackwash it, dry it, insert the core, and cast the pipe without moving the flask or its support or casting-plate; to dry the molds by a hot blast or current of heated air passing through (or forced through) a pipe, tunnel, or passageway, communicating independently with each of the molds, and so that the heated air may be admitted to or cut off from any one or more of said molds; to dry the cores in boxes communicating with a common hot air or blast supply; and, generally, to improve the apparatus or devices employed in preparing the molds and cores for casting pipe, and for performing the various steps in the process of molding and casting.

The subject-matter claimed will hereinafter specifically be designated.

In the accompanying drawings all our improvements are shown as embodied in the best way now known to us for conjoint use in connection with a molding and casting pit; obviously, however, our improvements may be modified in details, and some of the parts or devices may be used without the others, as well as in connection with devices differing from those herein shown in some respects.

Figure 1:
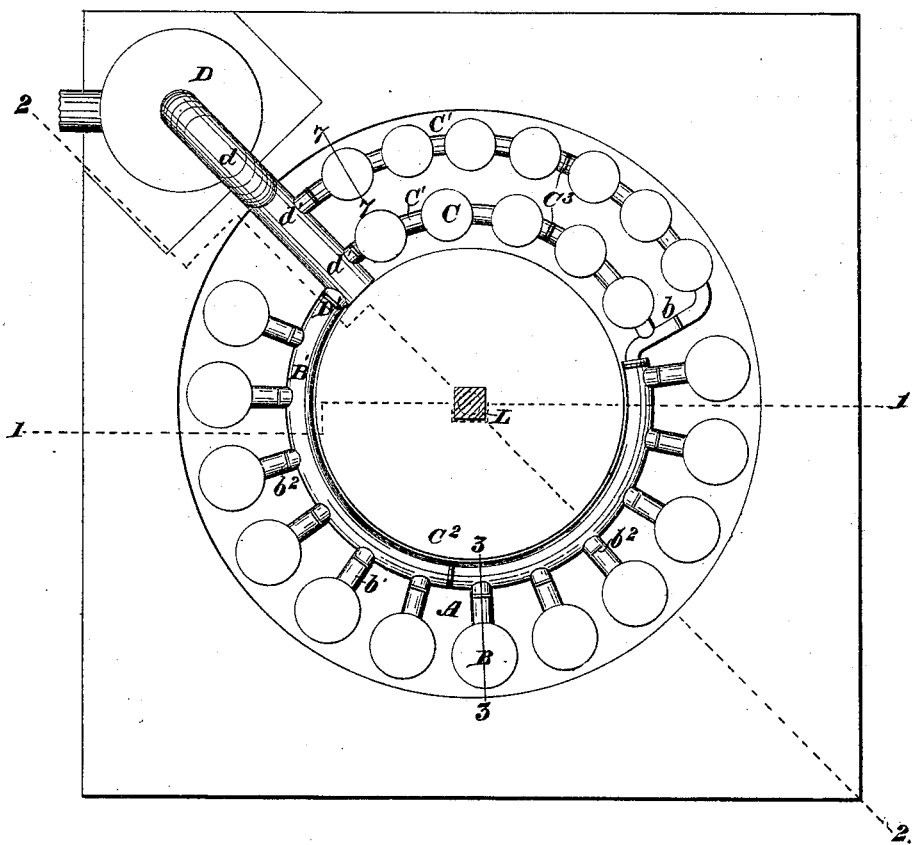
Figure 8:
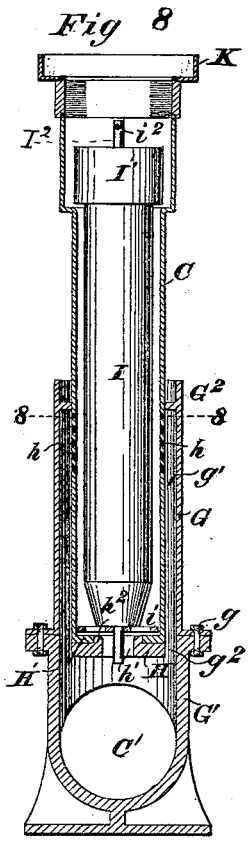
Figure 9:
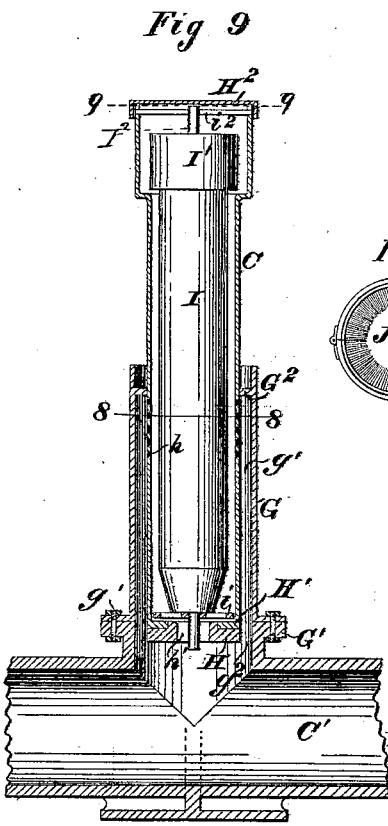
Figure 10:
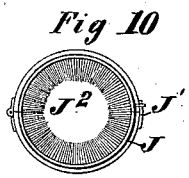
Figure 11:
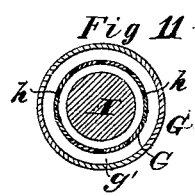
Figure 12:
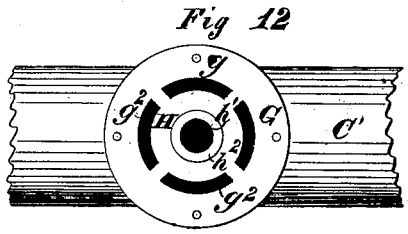
Figure 13:
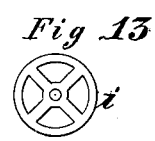
Figure 14:
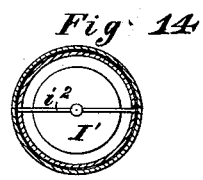
Figure 15:
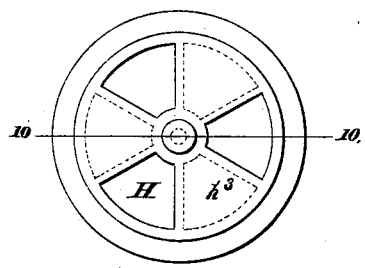
Figure 17:
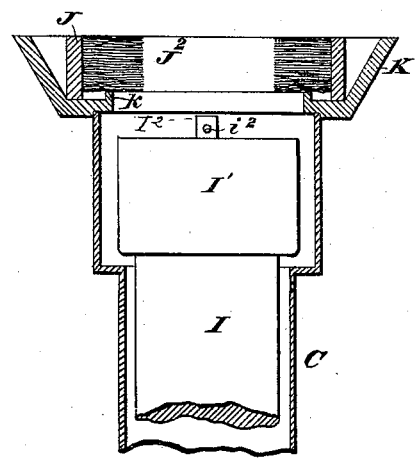
Figure 16:
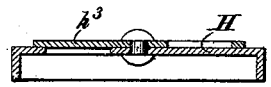
Figure 18:
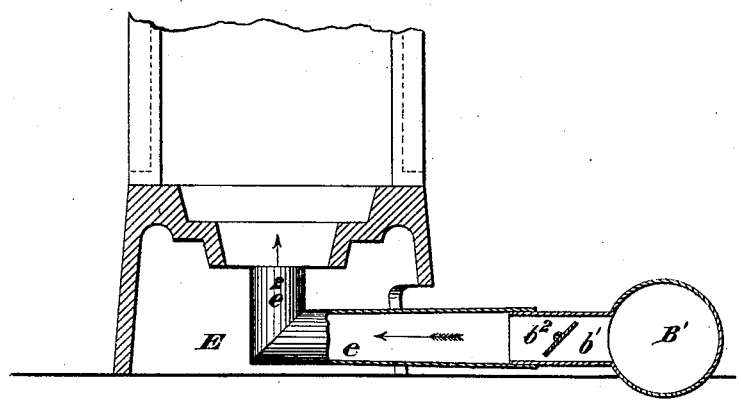

Figure 1 represents a plan or top view of the pit or trench, the hot-air furnace, and the pipes or channels for conducting the heated air to the flasks and core-drying boxes; Fig. 2, a vertical section on the line 1 1 of Fig. 1; Fig. 3, a similar section on the diagonal line 2 2 of Fig. 1. Fig. 4 is a vertical section on the lines 3 3 of Figs. 1 and 7, taken centrally through the flask, its pattern, casting-plate or bottom support, and bead-ring, as well as through the hot-air pipe and its connection with the flask bottom or base. This figure and those following it are on enlarged scales as compared with Figs. 1, 2, and 3. Fig. 5 is a transverse section on the lines 4 4 of Figs. 2 and 4; Fig. 6, a vertical section on the line 5 5 of Fig. 4 with the pattern omitted, showing the flask clamped upon its bottom or supporting-base, with the bead-ring in place; Fig. 7, a transverse horizontal section on the line 6 6 of Fig. 4. Fig. 8 is a vertical section through one of the core-drying boxes on the line 7 7 of Fig. 1, as well as through its hot-air-supplying pipe, with the core, the brush for black-washing it, and the guide or protector for preventing the core coming in contact with the sides of the box in position; Fig. 9, a similar section at a right angle to Fig. 8 without the brush, showing the core as suspended, and the cover or cap in place upon the top of the box; Fig. 10, a plan or top view of the brush for applying the black-wash to the core as it is passed through the central opening therein; Fig. 11, a transverse horizontal section on the lines 8 8 of Figs. 8 and 9; Fig. 12, a plan or top view of the base section or support of the drying-box connecting it with the hot-air pipe; Fig. 13, a view of the guide and protector adapted to be secured upon the core-bar beneath the core-print to guard against injury to the core when inserting it in or withdrawing it from the drying-box, as well as insure its occupying a central position therein; Fig. 14, a transverse section on the line 9 9 of Fig. 9; Fig. 15, a plan or top view, on an enlarged scale, of the removable cap of one of the core-drying boxes, showing the regulator for controlling the amount of heated air allowed to pass through the box; Fig. 16, a vertical central section on the line 10 10 of Fig. 15; Fig. 17, a view, also on an enlarged scale, showing a vertical central section through the top of one of the drying-boxes, and a modified form of black-wash reservoir and brush-support therein; Fig. 18, a detail view, partly in section, showing the elbow-pipe connection between the hot-air pipe and flask bottom, with the cover for the opening in the side of the flask bottom dispensed with.

A pit, A, for molding, drying, and casting, may be of any desired shape to suit the views of the constructor, or to utilize the space at disposal, and may be constructed in any suitable well-known way. It is, by preference, made of circular form, as shown in the drawings, and apportioned to received an equal number of flasks B, and core-driers C. Obviously, the flasks might be arranged in a double row, and the entire pit might be used for the flasks alone, and a pit, either separate therefrom or connected therewith, employed to dry the cores.

In the construction shown, which is that preferred by us, a single hot-air furnace, D, located at the side of the pit opposite the space between the flask and core-divisions thereof, is employed to dry both the molds in the flasks B and the cores in the drying-boxes C. This furnace is constructed in any suitable well-known way, and the current of hot air or heated air and products of combustion therefrom pass by a pipe, $d$, to a suitable tunnel, passage way, or pipe, for supplying the blast of hot air to the flasks containing the molds, and to the drying-boxes containing the cores. In this instance the pipe $d$ passes down into the pit, and communicates at $D'$ $d'$ $d'$ with pipes $B'$ and $C^1$ $C^1$, respectively, leading the hot air to the molds and cores, and uniting with each other at $b$, on the opposite side of the pit.

Dampers or regulating-valves to cut off and adjust the supply of air may be provided in the pipes $B'$ and $C^1$ $C^1$, between the horizontal portion of the feed-pipe $d$ and the first of the series of flasks and core-boxes. A damper may be arranged in the pipe $B'$, near its juncture with the pipes $C^1$ $C^1$, so as to cut off communication between the core-drying pipes and the mold-drying pipe, that the hot air may be confined wholly to either section of the pit, if desired, or it may be cut off from portions of the pipes $B'$ and $C^1$ $C^1$, by means of dampers or valves $C^2$ $C^3$ $C^3$.

The heated air is led to the molds in the flasks by means of short pipes $b^1$, one for every flask. Regulating-valves or dampers $b^2$ in these conducting-pipes admit of the communication between each of the flasks, and the common supply-pipe or hot-air conveying-channel $B'$ being independently adjusted to regulate the quantity of heated air admitted to any one or more of the molds in the series of flasks in the pit, or shut off its admission entirely.

Similar independent connections may be made between the core-driers and their supply pipe or pipes; but we prefer to arrange the drying-boxes directly over the supply-pipes, and to admit the heated air to them at all times when it passes to the supply-pipes, while preventing the escape or waste of the heated air by caps, serving the purpose of dampers, fitting snugly on the tops of the boxes, as will hereinafter be explained.

A chambered or centrally hollowed casting-plate or flask bottom, E, one to support every flask B, first receives the heated air from the tunnel or supply-pipe $B'$, on its way to the flask through its conducting-pipe $b^1$. Each of these pipes $b^1$ is detachably connected with its respective flask bottom E—in this instance by means of an endwise-sliding section, $e$, which passes through and fits snugly in an opening in an adjustable side cover, $E'$, fitting across an opening, $e^1$, in the side or wall of the hollow flask bottom; or the cover may be dispensed with, and the section $e$ provided with an elbow, $e^2$, as in Fig. 18.

This opening $e^1$ is made of an area sufficiently great, as shown, to admit of the outer section $e$ of the conducting-pipe communicating with the supply-pipe, being moved to one side of the fixed section $b^1$ of the conducting-pipe when first slid endwise therefrom, and then moved outward. This detachable section may be slid outward far enough to detach it entirely from the adjustable cover $E'$, (when such cover is employed,) or until its inner end will allow the cover to be slid around sidewise on the bottom E, or removed therefrom to expose the entire side opening $e^1$ in the flask bottom, and admit of the insertion through said opening of a pan or other suitable vessel when the mold is being blackwashed to catch the surplus black-wash which runs or drips from the mold through the tapering central opening in the casting plate or top of the flask bottom, in which the core print or taper end of the pattern rests. This central opening, in the construction shown by the drawings, is surrounded by a horizontal annular shoulder or ledge, F, extending from the opening outward to the inclined side or inner wall $f$, which extends upward to the top surface $F^1$, upon which the flask rests, and to which it is securely clamped, when desired, by clamps $F^2$, Fig. 6, or in any of the usual well-known ways. The flasks are formed as usual of two vertical sections, capable of being readily hinged, locked, or clamped together, and opened or detached from each other. An internally-grooved ring, $f^1$, for forming the bead upon the spigot end of the pipe, rests upon the shoulder or ledge F of the casting-plate or bottom section E of the flask, and conforms to and fits snugly both upon this shoulder and against the inclined inner walls $f$, between the shoulder and top of the casting-plate. The inner surface or edges of this bead-ring, from its bottom to the recess or groove $f^2$ therein, are flush with the walls of the central opening in the casting-plate, and incline or taper correspondingly thereto, while its upper inner surface above the groove sets backward or outward from the center a distance equal the thickness of the metal of the pipe to be cast. The annular shoulder $f^3$ on the pattern rests upon or close to the bead-ring below the groove thereof, as shown, and, above this shoulder, touches or rests close to the inner edges of the upper surface of the ring. (See Fig. 4.)

The bead-ring $f^1$ may be made in two or more sections, and of metal, thus forming a chill-ring; or it may, as we prefer, consist of the ordinary core—sand, clay, loam, plaster-of-paris, &c.—and when thus made the core-ring may be formed in one or more pieces, as desired. The pattern being centered and supported by the opening in the casting plate or flask-support, the bead ring or core is not liable to injury in ramming the sand to form the mold.

It will be seen that the flask rests upon its support or casting-plate outside of the bead-ring, thus admitting of the ring, if of one piece, being lowered from above, and adjusted by means of the opening in the casting-plate when the flask is in place, as well as admitting of its removal without moving the flask while in position, by means of a hook lowered in the flask and adjusted around the ring. If made in two or more sections, the bead-ring may be inserted or removed from below, while the flask is in position on the casting-plate.

Each core-drier or heating-box C is, in this instance, formed of two sections, an inner detachable section and an outer stationary section, G, shown, by the construction illustrated in the drawings, as secured to a base or stand, $G^1$, formed with and projecting upward from the hot-air pipe $C^1$. The bolts $g$, which secure the box in place, admit of the ready separation of the main section G of the box from the pipe-connecting support, when desired. An annular space, $g^1$, between the inner and outer sections C G of the box, communicates at bottom with the hot-air pipe, through openings $g^2$ in the base G, and is terminated at top by an annular flange or shoulder, $G^2$, upon the inside of the outer section. Perforations $h$ in the shell of the inner section, just below the top of the air-space $g^1$, admit the hot air from this space to the inner section of the drier, which rests at bottom upon the annular seat or rest H, between the central opening $h^1$ and slots $g^2$ in the base $G^1$. An internal annular flange, $H^1$, on the bottom of the tube forming the inner section of the box, fits around a vertical annular shoulder, $h^2$, surrounding the central opening $h^1$ in the base, and, in connection with the shoulder $G^2$, holds the inner section securely in an upright position, while admitting of its ready withdrawal from and reinsertion in the outer section. The top of the drying-box is enlarged to accommodate the bell end or head $I^1$ of a core, I, and is fitted with a removable cap or cover, $H^2$, preferably provided with a damper or valve, $h^3$, by which, when the cap is in place, the escape of hot air may be regulated. A guard, $i$, secured upon the end of the core-bar beneath the core-print, and in contact with or close thereto, guides and centers the core when being inserted in and removed from its drying-box, and prevents injury to the core which might otherwise arise from its contact with the box. This guard and protector may be secured upon the core-bar in any suitable manner admitting of its ready attachment to and removal from the bar. The core may be suspended in the drier by means of a rod, $I^2$, passed through an eye in the core-bar and supported in notches in the edge of the top of the drier. In this manner the weight of the core is sustained entirely by its central bar.

The cores are blacked by a brush saturated with black-wash, having a central opening in it, and adapted to encircle the core as it passes through it before or after drying. The brush-framing J is, by preference, formed of sections hinged to each other and provided with a suitable catch or fastening, $J^1$, to lock the sections together. The bristles $J^2$ project inward a distance sufficient to leave a space in the center of the brush less in diameter than the body of the core, as shown. A centrally-open pan or reservoir, K, for the wash is placed upon the brush and rests on its frame, as shown in Fig. 8; or the brush may rest in the pan, as in Fig. 17, and the surplus wash prevented from escaping by the flange $k$. The reservoir is prevented from lateral displacement by suitable lips or shoulders and flanges on the edge of the opening in the pan and on the top of the brush-frame.

To apply the black-wash, as the core is withdrawn from the drying-box, the core is raised until the top surface of its enlarged end or head projects through, or partially through, the brush, the bristles of which yield to allow the core to enter the opening between their ends; or the core may be elevated to this position and the brush adjusted and clamped around it. The black-wash is then poured into the reservoir in quantity sufficient to completely saturate and keep saturated the brush and coat the core as it is drawn out of the drier.

If it is desired to apply the wash when the core is being lowered into the drier, the wash is poured into the pan in like quantity after the core has been lowered far enough to close the central opening in the brush.

Instead of forming the hot-air-conveying pipe $C^1$ of a large size, about corresponding in cross-section with the size of the main section of the drier, as shown in Figs. 8 and 9, it is obvious that a much smaller pipe might be employed, as in Figs. 1, 2, and 3, and the stand or base-support of the drier tapered down to a size corresponding with the pipe at its junction therewith; and that a single outer section may have several inner sections, to which the heated air passes from the space between the outer section and the inner sections; and it is also obvious that instead of a double or sectional drying-box, the box may be made of a single tube, and all the hot air admitted thereto pass in at the base. Several furnaces may be employed to supply the current of hot air for the molds and core-driers, if desired. The supply pipes or tunnels may be arranged above the bases of the flasks and driers, and the heated air forced downward, if desired. A pit may be dispensed with, and the flasks and cores arranged in rows upon the floor of the foundry, if desired.

The operation of molding and casting is as follows: The flask-sections having been secured together, and clamped upon their bottoms or base-sections, the bead-rings, if not already in position in their seats, are lowered and adjusted in place, the patterns are inserted, and the sand is rammed, as usual. A mold being formed, the pattern is withdrawn, and a pan placed in the flask bottom through its uncovered side opening. The black-wash is then applied to the mold in any suitable well-known way, and the surplus black-wash caught in the pan, thus preventing waste. The pan is removed from the bottom, the cover (when one is used) adjusted to close the opening, the connection made by the sectional pipe with the hot-air pipe or passage-way, and by adjusting the damper in the connecting-pipe to admit the hot air to the mold it is ready to be dried. The work thus progresses until all the molds desired are formed. The furnace, if not already burning, is now started, and the heated air is admitted to the flasks containing the molds, passing directly upward through the centers of the molds by the opening in the casting-plate or top of the flask bottom. The cores, having been prepared, are lowered into the drying-boxes, as before described, by means of any suitable overhead railway, hoisting apparatus, or system of cranes, a single swinging crane, L, being shown in the drawings, for the purpose of illus ration. The heated air enters the core-drier both at the bottom and at the sides through the perforations. In this way the core is more uniformly heated and dried than it would be were the hot air admitted at the bottom only, as it would be were a single box used. The molds and cores having become sufficiently dry, the heated air is shut off from each or any number of the flasks and driers, or from their supply-pipes, and the crane used to raise and carry the cores to the molds. The casting then takes place, the ladle for the molten metal being carried by the crane, or in other suitable well-known way, to each mold in turn. When ready for stripping or dumping, the flasks are raised from the pit by any suitable connection between them, and the raising apparatus being then moved for the first time since the beginning of the operation. When the castings are removed, the flasks are returned to the pit by the crane or hoisting apparatus by which they were removed, and the above operations are repeated.

It will be seen that, by our improvements, from the time the flasks are lowered upon their bottoms or casting-plates, neither the flasks nor bottoms are moved until the flasks are removed for dumping; the molds are rapidly dried where formed; the molders are kept continuously at work; the casting may go on as soon as a portion of the molds are ready to receive the metal, without interfering with the molders engaged upon the remaining molds, the flasks or similar ones being replaced at one end of the row in time to begin upon them after finishing at the other end.

We claim as our invention—

1. The improvement in the art of molding and casting pipe, hereinbefore described, which consists in forming the molds in a series of movable flasks arranged in a pit, blacking the molds, drying them by heated air from a common supply, inserting previously-dried cores therein, and casting, by successive steps, without moving the flasks or their bottoms, substantially in the manner and by the means set forth, whereby, as fast as ready, any one or more of the flasks may be removed, stripped, and returned to the pit, without interfering with work upon those in position, for a repetition of the above-described steps, thus rendering the work continuous.

2. The combination, substantially as hereinbefore set forth, of a supply-pipe or passage-way, through which a current of heated air passes, a series of pipes communicating with said supply-pipe or passage-way, and connecting it with a series of flask-bottoms and valves or dampers in said pipes, whereby the heated air may be admitted to any one or more of the flask bottoms from a common supply, to dry the molds in the flasks.

3. The combination, substantially as hereinbefore set forth, of the pit, the hot-air furnace, the supply-pipe communicating therewith, the flasks, the connecting-pipes by which the heated air is admitted to the flasks from the supply-pipe, and valves in the connecting-pipes.

4. The hollow casting-plate or flask bottom hereinbefore set forth, having a side opening to admit heated air to its interior, and a central opening for the ascent of the heated air to the inside of the mold.

5. The combination, substantially as hereinbefore set forth, of the flask bottom, its side opening, and the sectional pipe passing through said opening.

6. The improvement in the art of molding pipe, hereinbefore described, which consists in drying the cores in a series of drying-boxes, connected, independently of each other, with a common heated-air-supply pipe.

7. The combination, substantially as hereinbefore set forth, of a supply-pipe or passage-way, through which a current of heated air passes, and a series of vertical core-drying boxes, to which the heated air is admitted, and confined or allowed to escape, at will.

8. The combination, substantially as hereinbefore set forth, with the pit, of the core-drying heated-air pipes, the mold-drying heated-air pipe, and a common connection between them and the hot-air-supplying furnace.

9. The combination of the flask and the hollow casting-plate or flask bottom, having a side opening, a central opening in its top, and a seat for the bead-ring surrounding said central opening, located wholly inside that portion of the casting-plate upon which the flask is supported, as described, whereby the bead-ring may be adjusted in position while the flask is in place upon its bottom, by means of the side opening, as set forth.

10. The combination, substantially as hereinbefore set forth, of a hot-air-supply pipe, the stand or support for the drier projecting therefrom, and the drier detachably secured upon the stand.

11. The drying-box, constructed substantially as hereinbefore set forth, with an outer and an inner section, having a heated-air space between them, into which the heated air is admitted at the bottom, and from which it passes at the top to the inner section.

12. The combination of the base, the stationary section of the drier secured thereto, and the removable inner section of the drier, substantially as set forth.

13. The combination of the core-bar, and the guide or guard adapted to be secured upon and detached from the end of the bar, as and for the purpose set forth.

14. The hinged sectional annular brush-frame, adapted to be locked together, provided with internally-projecting bristles, and having a central opening for the passage of the core.

15. The combination of the annular brush-frame, its centrally-open bristles, and the centrally-open pan or black-wash reservoir, as and for the purpose set forth.

16. The combination, substantially as hereinbefore set forth, with the drier, of the annular centrally-open brush and the black-wash pan, whereby the core may be blackwashed as it is lowered in or withdrawn from the drier.

In testimony whereof we have hereunto subscribed our names.

HERBERT R. SMITH.
NICHOLAS K. WADE.

Witnesses:
HENRY C. TAYLOR,
T. P. OGDEN.